(12) United States Patent
Funk et al.

(10) Patent No.: US 7,178,798 B1
(45) Date of Patent: Feb. 20, 2007

(54) CUTTING BOARD

(76) Inventors: Tyler C Funk, 3594 Burtless Rd., Moravia, NY (US) 13118; John Albabese, 8602 Route 3, Canastota, NY (US) 13032

( * ) Notice: Subject to any disclaimer, the term of this patent is extended or adjusted under 35 U.S.C. 154(b) by 0 days.

(21) Appl. No.: 11/091,839

(22) Filed: Mar. 28, 2005

(51) Int. Cl.
*B23Q 3/00* (2006.01)

(52) U.S. Cl. .............................. 269/289 R; 269/302.1

(58) Field of Classification Search ........... 269/289 R, 269/302.1, 303, 315, 13
See application file for complete search history.

(56) References Cited

U.S. PATENT DOCUMENTS

| | | | |
|---|---|---|---|
| 457,052 A * | 8/1891 | Metcalf | 269/302.1 |
| 630,746 A * | 8/1899 | Sargent, Jr. | 269/302.1 |
| 1,745,805 A | 2/1930 | Miller | |
| 2,751,951 A | 6/1956 | Strathaus | |
| 2,868,145 A * | 1/1959 | Brooke | 249/158 |
| 3,995,844 A | 12/1976 | Hellman | |
| 4,790,097 A * | 12/1988 | Blackiston | 43/4 |
| 4,798,372 A | 1/1989 | Tingle | |
| 4,840,361 A | 6/1989 | Richter | |
| 4,907,789 A | 3/1990 | Tice | |
| 5,527,022 A | 6/1996 | Gibson | |
| 6,422,551 B1 * | 7/2002 | Brotz | 269/289 R |
| 6,536,753 B1 | 3/2003 | Keener | |
| 6,644,639 B1 | 11/2003 | Newton | |
| 6,715,748 B2 | 4/2004 | Thompson et al. | |

FOREIGN PATENT DOCUMENTS

| | | |
|---|---|---|
| DE | 1.135.133 | 8/1962 |
| GB | 529.268 | 11/1940 |

* cited by examiner

*Primary Examiner*—Lee D. Wilson
(74) *Attorney, Agent, or Firm*—Michael I Kroll

(57) ABSTRACT

An improved cutting board comprising a top surface and a bottom surface. The top surface is bounded by a raised edge curvlinearly extending into a channel encompassing a planar worksurface. At one end the channel pools into a reservoir having a spillway with a lip extending sconce-like and coplanar with the raised edge forming a spout. The bottom side is notched serving as a handhold opposing the spout. The work surface recess that serves to decrease mass is ribbed by a lattice of intersecting walls providing a lightweight product while substantially increasing the work surface load capacity.

2 Claims, 9 Drawing Sheets

CUTTING BOARD

BACKGROUND OF THE INVENTION

1. Field of the Invention

The present invention relates generally to cutting boards and, more specifically, to an improved cutting board comprising a top surface and a bottom surface. The top surface is bounded by a raised edge curvlinearly extending into a channel encompassing a planar worksurface. At one end the channel pools into a reservoir having a spillway with a lip extending sconce-like and coplanar with the raised edge forming a spout. The bottom side is notched serving as a handhold opposing the spout. The work surface recess that serves to decrease mass is ribbed by a lattice of intersecting walls providing a lightweight product while substantially increasing the work surface load capacity.

2. Description of the Prior Art

There are other devices designed as cutting boards. Typical of these is U.S. Pat. No. 1,745,805 issued to Miller on Feb. 4, 1930.

Another patent was issued to Strathaus on Jun. 26, 1956 as U.S. Pat. No. 2,751,951. Yet another U.S. Pat. No. 3,995,844 was issued to Hellman on Dec. 7, 1976 and still yet another was issued on Jan. 17, 1989 to Tingle as U.S. Pat. No. 4,798,372.

Another patent was issued to Richter on Jun. 20, 1989 as U.S. Pat. No. 4,840,361. Yet another U.S. Pat. No. 4,907,789 was issued to Tice on Mar. 13, 1990. Another was issued to Gibson on Jun. 18, 1996 as U.S. Pat. No. 5,527,022 and still yet another was issued on Mar. 25, 2003 to Keener as U.S. Pat. No. 6,536,753.

Another patent was issued to Newton on Nov. 11, 2003 as U.S. Pat. No. 6,644,639. Yet another U.S. Pat. No. 6,715,748 was issued to Thompson et al. on Apr. 6, 2004. Another was issued to Little on Nov. 18, 1940 as U.K. Patent No. GB529,268 and still yet another was issued on Aug. 23, 1962 to Herpa-Spielwaren Hergenrother Co. as German Patent No. DE1135133.

U.S. Pat. No. 1,745,805

Inventor: Charles H. Miller

Issued: Feb. 4, 1930

A tray of the character described, comprising a main frame, a body within said main frame, an auxiliary frame removably positioned in the: main frame, and spaced longitudinally extending members within the auxiliary framer.

U.S. Pat. No. 2,751,951

Inventor: John Strathaus

Issued: Jun. 26, 1956

A roast board comprising: a board having an annular recess therein, a ring removably positioned in said recess, a plurality of prongs mounted upon said ring projecting above the surface of said board, and screws on said board, the heads of said screws overlapping said ring, said ring having notches therein permitting removal of said ring when aligned therewith.

U.S. Pat. No. 3,995,844

Inventor: Werner Hellman

Issued: Dec. 7, 1976

The improved, plastic carving board disclosed herein is for cutting foods and the like. The carving board includes an upper, flat cutting surface that has an annular recess therein. A metal spike-ring, having a plurality of upstanding spikes, is disposed in the annular recess so that the upper ends of the upstanding spikes may engage and hold the food and the like being cut. The spike-ring may be selectively removed from the annular recess to facilitate the cleaning of the spike-ring and the carving board and may be rotated within and with respect to the annular recess to facilitate cutting.

U.S. Pat. No. 4,798,372

Inventor: Joseph R. Tingle

Issued: Jan. 17, 1989

A cutting tray is formed in two parts: a bottom portion or pan, and a removeable cutting platform. The pan is molded to include a central raised platform support having a recessed bottom and an upright rim. The recessed bottom may include reinforcing ribs. The cutting platform is provided in a plurality of forms including different cutting surface areas and cutting surface textures. The cutting platform is removeably secured to the raised platform support by protuberances on the cutting platform fitting into receptacles on the platform support, or by having a recessed bottom on the cutting platform which mates with the platform support.

U.S. Pat. No. 4,840,361

Inventor: Hans-Jurgen Richter

Issued: Jun. 20, 1989

A household board such that the cutting surface of the board is slightly sloped starting from the edge bordering the juice channel to the juice channel disposed on the opposite edge of the board, and that the side of the board opposite the cutting surface is divided by means of projecting ribs into chambers forming working trays.

U.S. Pat. No. 4,907,789

Inventor: Ralph Tica

Issued: Mar. 13, 1990

A cutting board assembly is disclosed. The assembly includes a board member which has an upper cutting surface with a groove around the periphery thereof. The cutting surface includes an elongated slot therethrough with the groove being inclined towards the slot. A generally L-shaped flange extends from the underside of the board and surrounds the elongated slot. A plastic bag is adapted to fit over a leg of the L-shaped flange which extends outwardly of the elongated slot. An elastic band is provided to sealably attach the plastic bag around the generally L-shaped flange.

U.S. Pat. No. 5,527,022

Inventor: Jeremy H. Gibson

Issued: Jun. 18, 1996

This invention is a protective cover for a keyboard or other control panel with attachment means, using different options as preferred for specific equipment. The cover can be separately obtained and secured to the housing or chassis of various equipment. The purpose of the cover is to allow owners of equipment with control panels and keyboards, including touch pads, to separately purchase a protective cover that can be secured to the equipment. The cover is for protection against inadvertent key or button depression, settling of dust, spattering of liquid, and other adverse effects. The invention consists of (1) a lid, also referred to as a plate in this disclosure, and (2) a frame that is attachable to the housing of keyboards by adhesive regions on the bottom of the frame or other means as described in this patent. Adhesive regions can consist of peel-off adhesive, suction cups, stick-on VELCRO regions, snaps, and the like. Other means include spring-loaded clamps that fit snugly onto the chassis. The plate can be permanently hinged to the frame of the cover or it can be removable at the hinge by snapping it in and out of the frame, or can be otherwise detaching.

U.S. Pat. No. 6,536,753

Inventor: Kit L. Keener

Issued: Mar. 25, 2003

A cutting board assembly includes a generally horizontal board member having two generally longitudinal edges and opposing first and second transverse edges defining an upper cutting surface and a lower support surface. A support structure is attached to said lower surface forming an opening underneath the first transverse edge of the board member. The assembly further includes an integral or removable trough having a first end disposed within the opening and an opposing second end extending outwardly beyond the first transverse edge of the board member.

U.S. Pat. No. 6,644,639

Inventor: Edward R. Newton

Issued: Nov. 11, 2003

A cutting board having a planar upper surface, a generally flat bottom surface, a peripheral wall extending upwardly adjacent to the side edges and the back edges of the upper surface, and peripheral trough formed between the side edges and the peripheral wall. The upper surface is inclined at approximately 2.degree. from the front edge to the rear right back edge. A canal is formed between the second side edge of the upper surface and the second side wall. This canal is tapered so as to widen toward the back edge. The canal contains a corner well to collect juices from the trough sections and canal.

U.S. Pat. No. 6,715,748

Inventor: Ted Thompson et al

Issued: Apr. 6, 2004

A modular cutting board having especial utility in non kitchen environments in which at least two plates are hingeably connected, and being relatively movable between a working position in which the cutting board presents a broad coplaner working surface and a transport and storage position in which the working surfaces of the plates are in face to face relation.

U.K. Patent Number GB529,268

Inventor: Eric Charles Little

Issued: Nov. 18, 1940

In a device for facilitating the slicing of cooked meats, joints &c. comprising a spiked turntable 13 for supporting the meat &c. journalled upon a base member 11 provided with an inverted V-shaped rubber ring 12 or other gripping means, a one-way clutch is provided to allow of rotation of the turntable in one direction only. The turntable is journalled upon the base by means of a ring of balls 14 acting between races 15 fast with the base and turntable, and is centrally held by a pin 16 passing through a central opening in the base. The lower end of the pin carries a ratchet wheel 18 which engages with a spring-pressed pawl 19 secured on the underside of the base. The meat is penetrated by a knife applied to one edge and the turntable then partly rotated to enable the knife to slice the meat further round its periphery.

German Patent Number DE1135133

Inventor: Herpa Spielwaren Hergenroether Co.

Issued: Aug. 23, 1962

A servicing tray as disclosed in the art of the patent application.

While these cutting boards may be suitable for the purposes for which they were designed, they would not be as suitable for the purposes of the present invention, as hereinafter described.

SUMMARY OF THE PRESENT INVENTION

A primary object of the present invention is to provide an improved cutting board.

Another object of the present invention is to provide a cutting board that is lightweight.

Yet another object of the present invention is to provide a cutting board having a worksurface bounded by a channel.

Still yet another object of the present invention is to provide a cutting board having a raised edge with a spillway at one end.

Another object of the present invention is to provide a cutting board having a work surface reinforced by a lattice of interconnected wall segments.

Yet another object of the present invention is to provide a reservoir communicating with said channel and said spout.

Additional objects of the present invention will appear as the description proceeds.

The present invention overcomes the shortcomings of the prior art by providing an improved cutting board comprising a top surface and a bottom surface. The top surface is bounded by a raised edge curvilinearly extending into a channel encompassing a planar worksurface. At one end the channel pools into a reservoir having a spillway with a lip extending sconce-like and coplanar with the raised edge forming a spout. The bottom side is notched serving as a handhold opposing the spout. The work surface recess that serves to decrease mass is ribbed by a lattice of intersecting walls providing a light weight product while substantially increasing the work surface load capacity.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
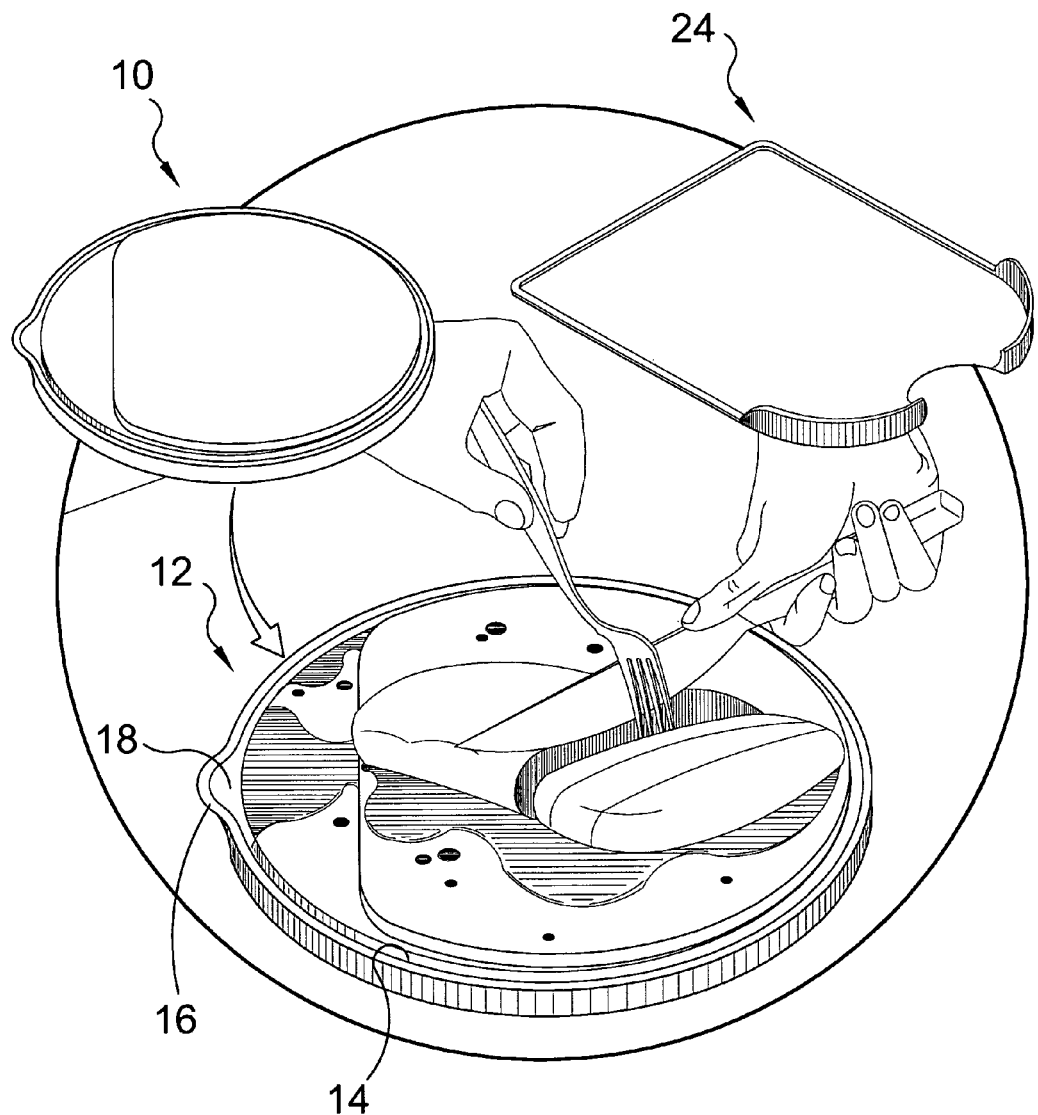
FIG. 1 is an illustrative view of the present invention in use.

Turning now descriptively to the drawings, in which similar reference characters denote similar elements throughout the several views, the figures illustrate the Improved Cutting Board of the present invention. With regard to the reference numerals used, the following numbering is used throughout the various drawing figures.

10 Improved Cutting Board of the present invention
12 cutting surface
14 channel
16 pour spout
18 reservoir
20 bottom of 10
22 top of 10
24 vegetable cutting board
26 raised edge
28 handhold
30 lattice corrugations
32 rubber nail diskettes

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention 10 in use. The present invention 10 a cutting board having an elliptical shape and flat cutting surface 12 with a gravy channel 14 encompassing the outer edge of said cutting board 10. The cutting board 10 has a rolled lip with a pour spout 16 on one end. This design allows juices to remain within said channel 14 of the cutting board 10 rather then on the counter top. On the bottom of the cutting board 10 is a corrugated design to lighten the board and strengthen it and a plurality of rubber nail diskettes. A vegetable cutting board 12 is also included to be used in conjunction with cutting board 10.

Figure 2:
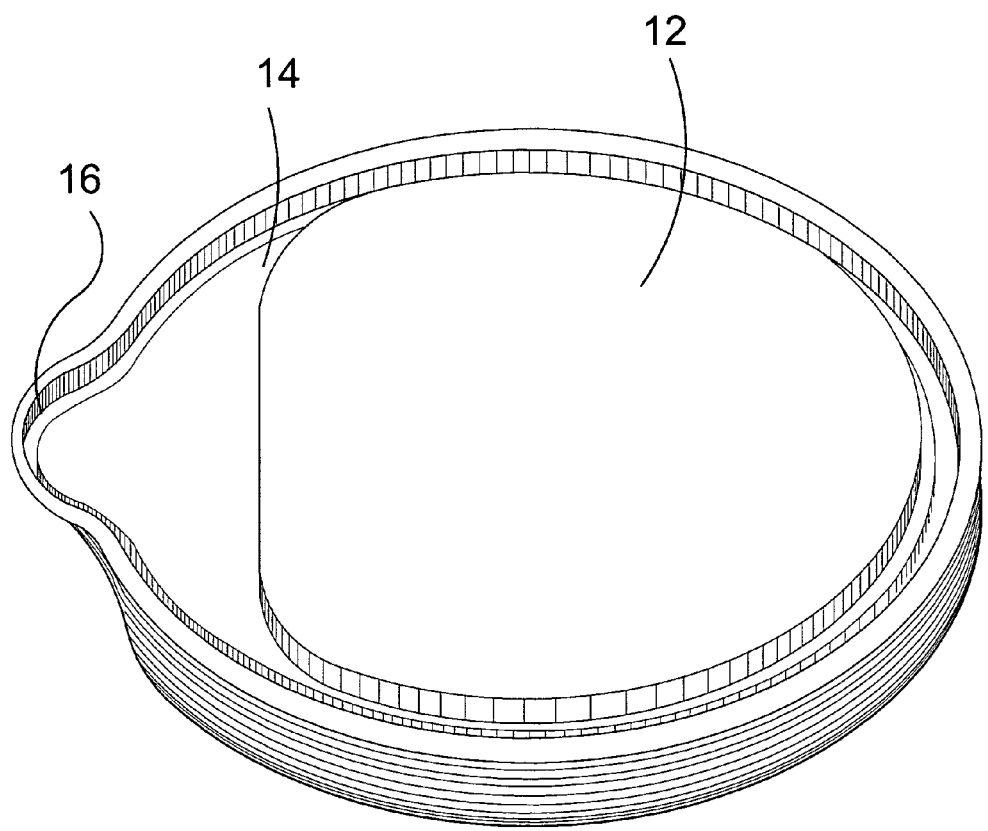
FIG. 2 is a perspective view of the present invention.

FIG. 2 is a perspective view of the present invention 10. Shown is the cutting board 10 having a top surface 22 and a bottom surface 20. The cutting surface 12 is bounded by a raised edge 26 curvlinearly extending into a channel 14. At each end the channel 14 pools into a reservoir 18 having a spillway with a lip extending sconce-like and coplanar with the raised edge forming a pour spout 16. The bottom side has a notch forming a handhold on the end opposing the spout. The recess of the work surface is ribbed by a lattice serving to decrease mass reducing the weight while substantially increasing the work surface load capacity.

Figure 3:
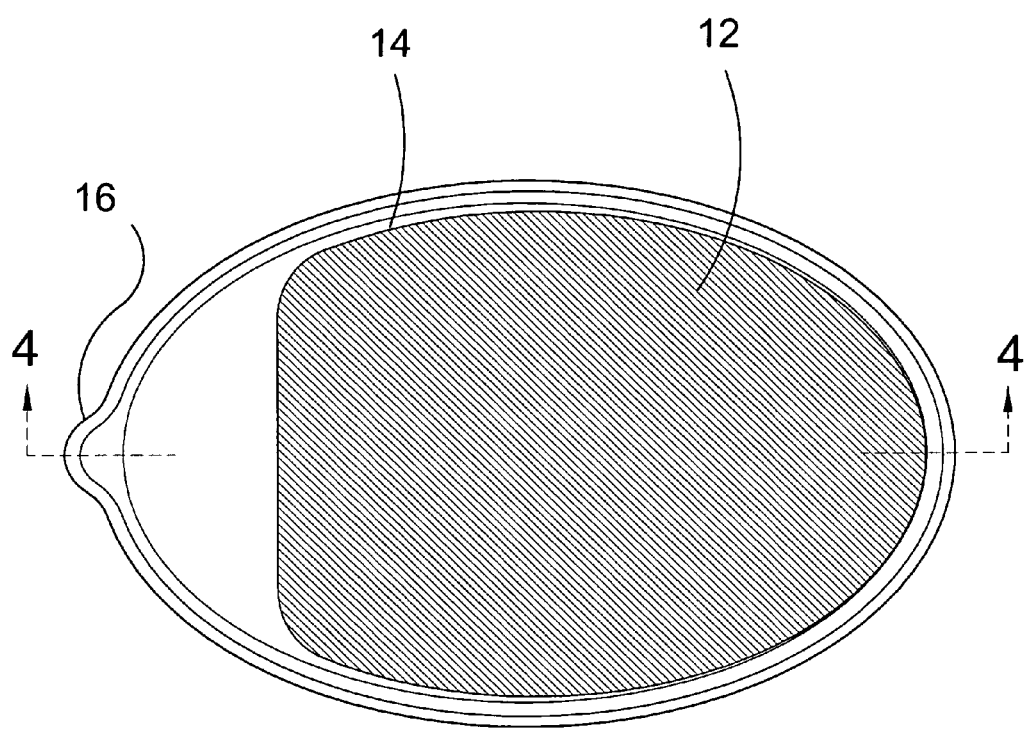
FIG. 3 is a top view of the present invention.

FIG. 3 is a top view of the present invention 10. Shown is a top view of the present invention 10 having an elliptical shape and flat cutting surface 12 with a gravy channel 14 encompassing the outer edge of said cutting surface 12. Said cutting board 10 having a rolled lip with a pour spout 16 on one end. On the bottom of the cutting board is a corrugated design to lighten the board and strengthen it. Also, on the bottom of said cutting board is a plurality of rubber nail diskettes.

Figure 4:
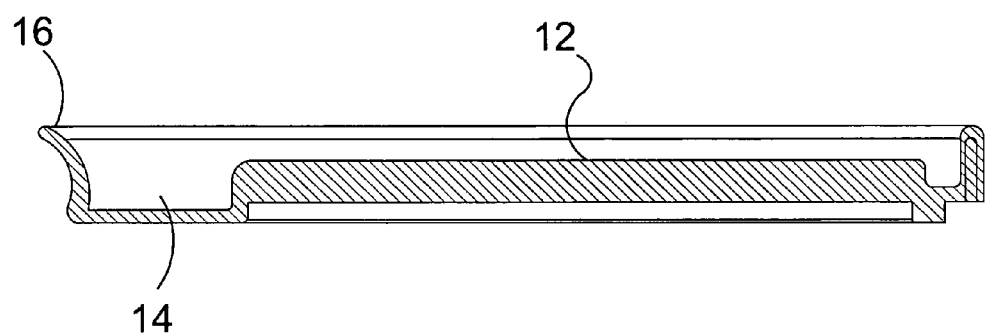
FIG. 4 is a sectional view of the present invention.

FIG. 4 is a sectional view of the present invention 10. Shown is a sectional view of the present invention cut from FIG. 3, having an elliptical shape and flat surface with a gravy channel 14 encompassing the outer edge of said cutting board. Said cutting board having a rolled lip with a pour spout 16 on one end. On the bottom of the cutting board is a corrugated design to lighten the board and strengthen it. Also, on the bottom of said cutting board is a plurality of rubber nail diskettes.

Figure 5:
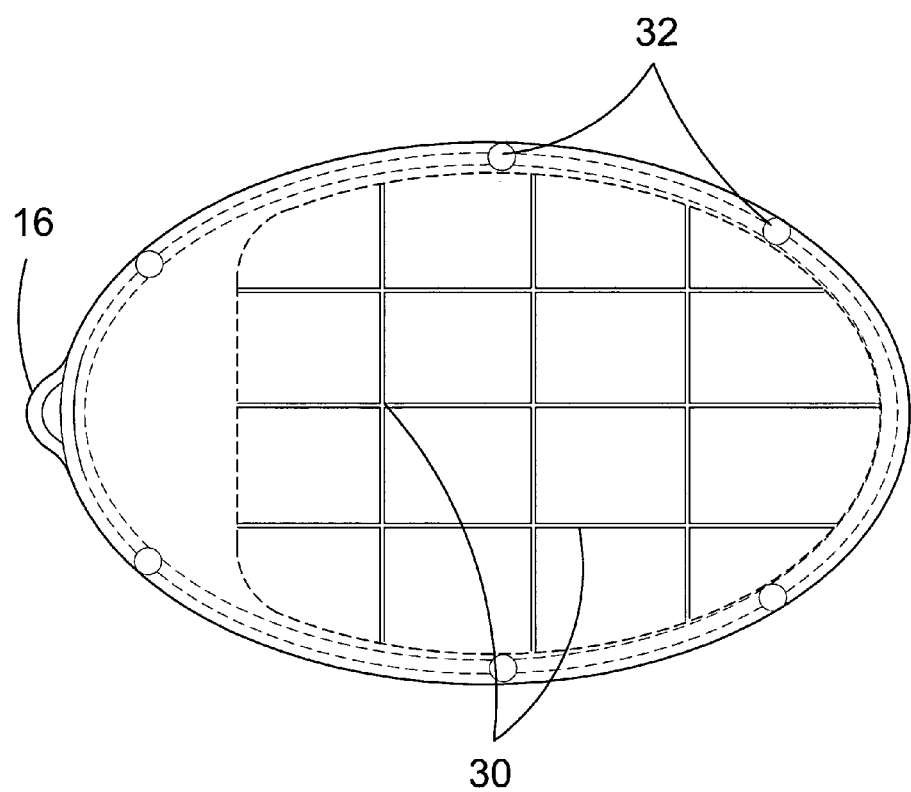
FIG. 5 is a bottom view of the present invention.

FIG. 5 is a bottom view of the present invention. Shown is the bottom side 20 having a notch forming a handhold 28 on the end opposing the spout 16. The recess of the work surface is ribbed by a corrugated lattice 30 serving to decrease mass reducing the weight while substantially increasing the work surface load capacity.

Also illustrated in FIG. 5 are rubber nail diskettes.

Figure 6:
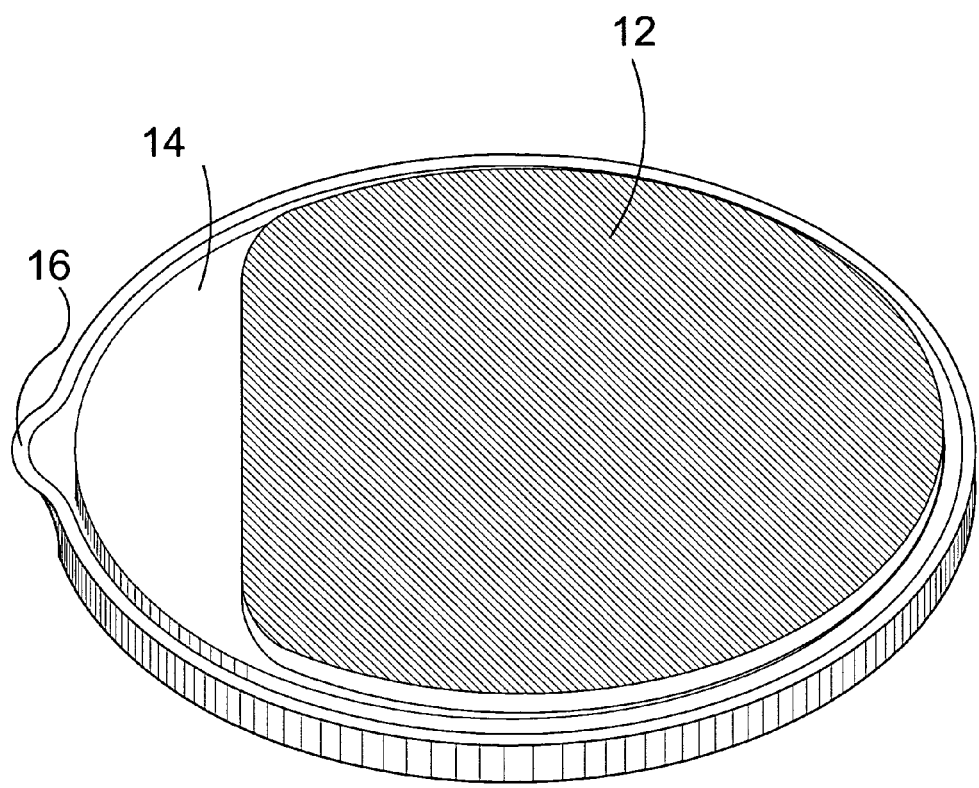
FIG. 6 is a perspective view of a larger model of the present invention.

FIG. 6 is a perspective view of a larger model of the present invention 10. Shown is a larger model of the present invention, a cutting board having an elliptical shape and flat surface with a gravy channel 14 encompassing the outer edge of said cutting board. Said cutting board having a rolled lip with a pour spout 16 on one end. This design allows juices to remain within said channel 14 of the cutting board rather then on the counter top. On the bottom of the cutting board is a corrugated design to lighten the board and strengthen it. Also, on the bottom of said cutting board are a plurality of rubber nail diskettes.

Figure 7:
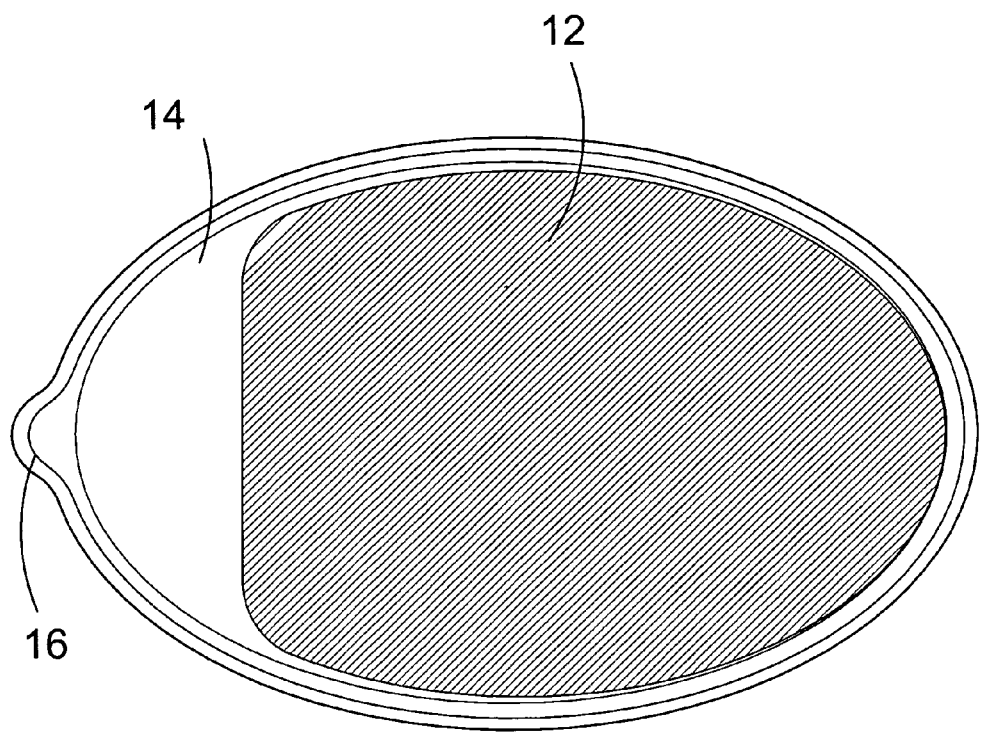
FIG. 7 is a top view of a larger model of the present invention.

FIG. 7 is a top view of a larger model of the present invention 10. On the bottom of the cutting board is a corrugated design to lighten the board and strengthen it. Also, on the bottom of said cutting board are a plurality of rubber nail diskettes.

Figure 8:
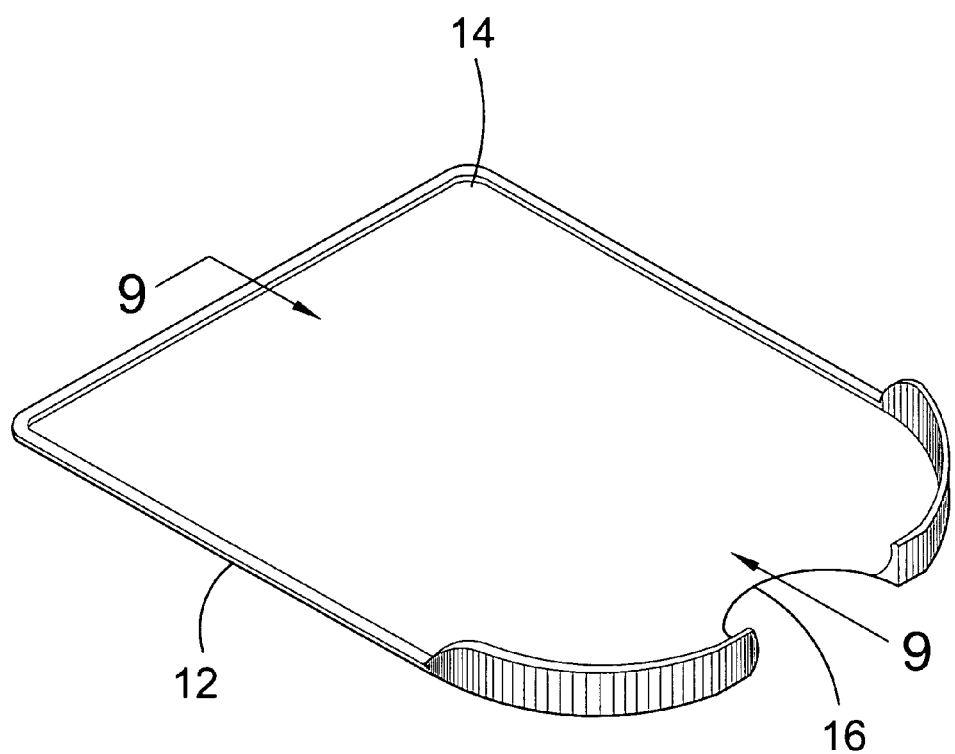
FIG. 8 is a perspective view of a vegetable cutting board of the present invention.

FIG. 8 is a perspective view of a vegetable cutting board 26 of the present invention. Shown is a vegetable cutting board 26 of the present invention, having a funnel shape end, allowing a user to chop up veggies on a stove or counter without creating a mess. The easy pour funnel 16 makes it clean and easy to dispense the chopped foods.

Figure 9:
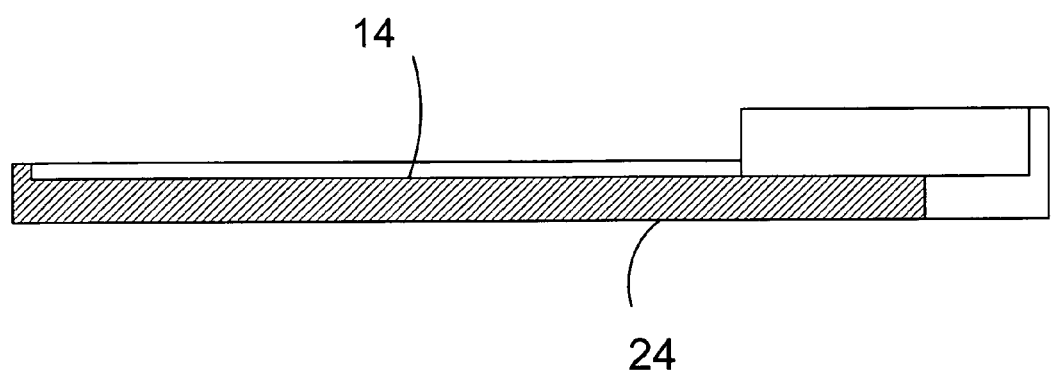
FIG. 9 is a sectional view of a vegetable cutting board of the present invention.

FIG. 9 is a sectional view of a vegetable cutting board 26 of the present invention. Shown is a vegetable cutting board 26 of the present invention, having a funnel shape end 16, allowing a user to chop up veggies on a stove or counter without creating a mess. The easy pour funnel makes it clean and easy to dispense the chopped foods.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An improved cutting board comprising:
   a) a planar member forming a cutting board substantially elliptical in shape comprising a top cutting surface and a bottom surface;
   b) an annular channel extending proximal the periphery of said top cutting surface of said cutting board;
   c) a reservoir lower than said channel fed by said channel;
   d) a pour spout proximal said reservoir;
   e) a wall along a perimeter of said cutting board higher than said top cutting surface and forming said pour spout, said top cutting surface having an outer edge paralleling and spaced from said wall except in a region of said spout where said cutting surface is abbreviated to form said reservoir; and
   f) a vegetable cutting board on said top cutting surface so that vegetables are cut without the vegetables contacting the surface on which meat was cut, said vegetable cutting board comprising a planar cutting surface with a peripherally disposed channel and a funnel for focusing chopped vegetables therethrough during removal therefrom, a pair of spaced vertical walls at opposite corners at one end of said vegetable cutting board with said funnel between said vertical walls.

2. An improved cutting board as recited in claim 1, wherein said cutting board is fabricated of a durable material capable of withstanding the slicing motion of sharp knife blades thereon.

\* \* \* \* \*